US008292310B2

(12) United States Patent
Turner

(10) Patent No.: US 8,292,310 B2
(45) Date of Patent: Oct. 23, 2012

(54) BEDSIDE-READY PATIENT AMBULATORY DEVICE

(75) Inventor: David B. Turner, Eagleville, TN (US)

(73) Assignee: David B. Turner, Eagleville, TN (US)

( * ) Notice: Subject to any disclaimer, the term of this patent is extended or adjusted under 35 U.S.C. 154(b) by 383 days.

(21) Appl. No.: 12/800,434

(22) Filed: May 17, 2010

(65) Prior Publication Data

US 2011/0278809 A1 Nov. 17, 2011

Related U.S. Application Data

(63) Continuation-in-part of application No. 12/391,766, filed on Feb. 24, 2009, now Pat. No. 7,950,405.

(51) Int. Cl.
*B62B 3/00* (2006.01)

(52) U.S. Cl. .................................. 280/47.35; 280/47.34

(58) Field of Classification Search .................... 135/65, 135/66, 67; 248/121, 127, 128, 129; D24/128; 280/47.34, 47.35, 79.11, 79.2, 79.3, 79.6, 280/87.01, 87.021, 87.041, 87.051
See application file for complete search history.

(56) References Cited

U.S. PATENT DOCUMENTS

| | | | | |
|---|---|---|---|---|
| 2,459,066 | A * | 1/1949 | Duke | 297/5 |
| 3,195,550 | A * | 7/1965 | Ingalls et al. | 135/67 |
| 4,045,044 | A * | 8/1977 | Bierer | 280/87.021 |
| 4,111,445 | A * | 9/1978 | Haibeck | 280/79.3 |
| 4,251,044 | A * | 2/1981 | Olson | 248/166 |
| 4,266,765 | A * | 5/1981 | Sandoval et al. | 482/68 |
| 4,342,465 | A * | 8/1982 | Stillings | 280/87.051 |
| 5,000,407 | A * | 3/1991 | Juji et al. | 248/125.8 |
| 5,123,126 | A * | 6/1992 | Vincent | 4/480 |
| 5,172,715 | A * | 12/1992 | Webb | 135/67 |
| 5,217,419 | A * | 6/1993 | Harwood | 482/66 |
| 5,277,438 | A * | 1/1994 | Chuang | 280/42 |
| 5,320,122 | A * | 6/1994 | Jacobson et al. | 135/66 |
| 5,344,169 | A * | 9/1994 | Pryor et al. | 280/79.3 |
| D352,260 | S * | 11/1994 | Adamo | D12/133 |
| 5,378,215 | A * | 1/1995 | Harkins | 482/67 |
| 5,380,262 | A * | 1/1995 | Austin | 482/68 |
| 5,411,044 | A * | 5/1995 | Andolfi | 135/66 |
| 5,476,432 | A * | 12/1995 | Dickens | 482/67 |
| 5,479,953 | A * | 1/1996 | Pasulka | 135/66 |
| 5,531,238 | A * | 7/1996 | Azzarelli et al. | 135/66 |
| 5,538,268 | A * | 7/1996 | Miller | 280/87.05 |
| 5,551,105 | A * | 9/1996 | Short | 5/87.1 |
| 5,605,169 | A * | 2/1997 | Light | 135/66 |
| 5,704,577 | A * | 1/1998 | Gordon | 248/229.2 |
| 5,819,772 | A * | 10/1998 | Pi | 135/66 |
| 5,857,685 | A * | 1/1999 | Phillips et al. | 280/47.35 |
| 6,390,311 | B1 * | 5/2002 | Belokin | 211/204 |
| 6,503,176 | B2 * | 1/2003 | Kuntz | 482/66 |
| 6,539,562 | B1 * | 4/2003 | Bianca | 5/86.1 |
| 6,578,594 | B1 * | 6/2003 | Bowen et al. | 135/67 |

(Continued)

*Primary Examiner* — John R Olszewski
*Assistant Examiner* — Jacob Meyer

(57) ABSTRACT

The invention is Bedside-ready Patient Ambulatory Device to facilitate a patient in getting out of bed and moving about. The device itself includes three significant parts. The first is a U-shaped base frame member supported by six castor type wheels. The second member is a midframe member which is generally U-shaped and upwardly extending bent above the mid point of the distal legs of the U-shaped midframe member to form an upper portion generally planar with the underlying U-shaped base frame member. The third element is an I.V. pole supported vertically by crossbars on the midframe member and the base frame member. The device facilitates the ambulatory movement of a patient while serving as a transport vehicle for needed treatment paraphernalia.

10 Claims, 7 Drawing Sheets

U.S. PATENT DOCUMENTS 6,578,894 B2 * 6/2003 Motozawa .................. 296/35.2
6,595,530 B2 * 7/2003 Wood .......................... 280/42
6,601,864 B1 * 8/2003 Hoyt ....................... 280/304.1
6,607,202 B1 * 8/2003 Palmer ................... 280/87.021
6,672,321 B2 * 1/2004 Hamilton ..................... 135/67
6,743,156 B1 * 6/2004 Jacques et al. ............... 482/68
7,243,666 B2 * 7/2007 Carroll ....................... 135/67
7,275,554 B2 * 10/2007 Mullholand ................. 135/67
7,294,094 B1 * 11/2007 Howle ....................... 482/69
7,422,550 B1 * 9/2008 Pinero et al. ................ 482/68
7,484,740 B2 * 2/2009 Miller .................... 280/87.021
7,494,139 B2 * 2/2009 Turner et al. ........... 280/87.021
7,568,712 B2 * 8/2009 Kovachi et al. .......... 280/87.021
7,726,327 B2 * 6/2010 Battiston .................... 135/67
7,731,136 B1 * 6/2010 Chisolm et al. ............. 248/129
7,865,983 B2 * 1/2011 Newkirk et al. ............. 5/503.1
7,935,030 B1 * 5/2011 Nesbitt ....................... 482/68
7,950,405 B2 * 5/2011 Turner et al. ................ 135/67
8,152,181 B2 * 4/2012 Tomlinson ................ 280/47.34
8,166,988 B1 * 5/2012 Martin ......................... 135/67
8,191,909 B2 * 6/2012 Livengood et al. ........ 280/47.34
2002/0101048 A1 * 8/2002 Sword ..................... 280/47.38
2002/0140196 A1 * 10/2002 Crouch et al. ........... 280/87.051
2003/0127121 A1 * 7/2003 Hamilton ..................... 135/67
2004/0129305 A1 * 7/2004 Hamilton et al. ............ 135/67
2005/0001395 A1 * 1/2005 Fuentes .................... 280/47.35
2006/0016466 A1 * 1/2006 Carroll ........................ 135/67
2006/0017247 A1 * 1/2006 Farley ....................... 280/79.3
2007/0107761 A1 * 5/2007 Kovachi et al. .............. 135/67
2008/0078431 A1 * 4/2008 Battiston ..................... 135/67
2008/0272571 A1 * 11/2008 Turner et al. .............. 280/202
2009/0050187 A1 * 2/2009 Lamb .......................... 135/67
2009/0115158 A1 * 5/2009 Lawrence .................. 280/200
2010/0187785 A1 * 7/2010 Knappe et al. ........... 280/47.34
2010/0212708 A1 * 8/2010 Turner et al. ................ 135/67
2010/0263697 A1 * 10/2010 Catton ....................... 135/67
2011/0232665 A1 * 9/2011 Barnett, Jr. ................ 132/200

* cited by examiner

BEDSIDE-READY PATIENT AMBULATORY DEVICE

RELATED APPLICATION

This application is a continuation in part of U.S. patent application Ser. No. 12/391,766 entitled Enhanced Patient Mobility Apparatus, filed Feb. 24, 2009 now U.S. Pat. No. 7,950,405 having inventors David B. Turner and Ralph Myers.

BACKGROUND OF THE INVENTION

The invention described and claimed herein is a Bedside-ready Patient Ambulatory Device to facilitate not only a patient's easy movement about but also to facilitate the patient in leaving the bed and initiating such movement. In many instances patient recovery is closely related to the patient becoming ambulatory so as to gain muscle strength, good circulation, proper digestion and enhanced respiration and oxygen intake. Doctors and hospitals frequently encourage patients to become ambulatory as soon as possible after an operation or serious illness. Frequently, however, it is not possible for patients to simply leave a prone position in bed and walk by themselves. It is frequently necessary for patients to have assistance in walking while having access to oxygen, in vivo treatments administered from intravenous equipment support poles (I.V. poles) or oxygen enriched air. While many devices have been proposed in the past no single light-weight, extremely stable bedside-ready mobile support system transport devices like the present invention have heretofore been proposed. The invention which is the subject of this application is just such a system and is ideal for use by ambulatory or recovering patients.

The typical drip stand I.V. pole, while serving the function of enabling the use of various drugs to be intravenously administered is frequently too unstable to be used as a bedside device. Other devices while perhaps more stable suffer from other shortcomings such as an inadequate adjustable patient handle as a primary patient support means which can be elevated or lowered to a convenient bedside height. The convenient adjustable patient handle of the present invention is mounted to a vertically, upwardly extending I.V. pole which is supported by a crossbar support assembly on a base frame member from a central location amid the base frame member and cross support bar to give superior stability to the adjustable patient handle while allowing easy access by the patient to the ambulatory device by simply sitting on the edge of the bed and pulling himself forward.

The handle is unique in that it provides easy access from either side or the rear of the ambulatory device.

The bedside-ready ambulatory device is sturdy but lightweight and is designed with its principal structure and mass at or below bedside level to provide superior stability.

The beside-ready patient ambulatory device is ideal for short trips to the bathroom and readily enables the patient to move backward with the device being wide enough so that the patient can sit on a bathroom commode and yet not lose the ability to use the device to regain a prone position at a later time.

The bedside-ready patient ambulatory device is also able to accommodate patients not only upon arising and becoming mobile but it facilitates such mobility by enabling a patient to continue to remain mobile during extended ambulation under conditions where treatments such as intravenous administration of nourishment, medication, blood plasma, oxygen or catheterization equipment are needed.

SUMMARY OF THE INVENTION

The present invention is a bedside-ready patient ambulatory device for use by recovering patients in homes, rehab centers, nursing homes and hospitals. It provides such patients with stable, dependable, easy to use support for trips of short to moderate duration. One object of the present invention is to provide an enhanced bedside-ready patient mobility device which is sturdy, low cost, made of easily cleanable and easily accessible tubular framework having sufficient capacity and features to meet the patient's needs. In this regard it is necessary to provide a device which is easily approachable, stable and easy to maneuver yet has the transportability to enable the patient to accompany himself with necessary medications and other system support items needed while being ambulatory.

It is also an object of the present invention to provide an ambulatory device having a centrally located vertical I.V. pole sufficient in strength to not only support the apparatus that may necessarily have to be suspended at or above the patient's eye level without introducing unnecessary instability. This feature is accomplished by providing a plurality of castor type wheels, six being shown, which are distributed in a surrounding type pattern to provide stability when the pole is approached from any direction. This arrangement combined with one or more locking mechanisms on the wheels provide the stability necessary for a patient to have the necessary support to shift his weight from the edge of a bed to his feet and arms by gripping the I.V. pole and handle.

Similarly, the patient ambulatory device can be used by a patient wishing to transfer from a wheelchair to the device with minimal assistance.

Specifically the invention is an Bedside-ready Patient Ambulatory Device for use by ambulatory or recovering patients in and about home, rehab, sub-acute, and hospital facilities providing such patients with ease of mobility, stability and the ability to transport needed treatment equipment and necessities comprising: a low-cost, sturdy, tubular framework having a lower U-shaped base frame member wherein the lower U-shaped base frame member includes a crossbar support member interconnecting the two legs of said lower U-shaped base frame member at a distance from the terminal ends of the legs of the U-shaped member to provide walking space for the patient, the lower U-shaped base frame member further having a plurality of castor type wheels, two of which are attached each to a separate distil end of the U-shaped base frame member and two of which are attached in spaced relationship from each other on the bow of the U-shaped base frame member, and two castor type wheels being attached to the crossbar portion of the U-shaped base frame member, said castor type wheels lying in the same plane, the apparatus further comprises two support bars each extending from the bow of the U-shaped base frame member to the crossbar member at a point above the plane of the castor type wheels for facilitating the support of necessary medical devices and equipment which must be transported by a ambulatory patient. The apparatus also comprises a midframe member attached to the U-shaped base member. The midframe member has a crossbar stabilizer connected between the distal legs thereof. Lastly, a vertically extending I.V. pole is attached to the crossbar support member and the crossbar stabilizer.

DETAILED DESCRIPTION AND PREFERRED EMBODIMENT

Figure 1:
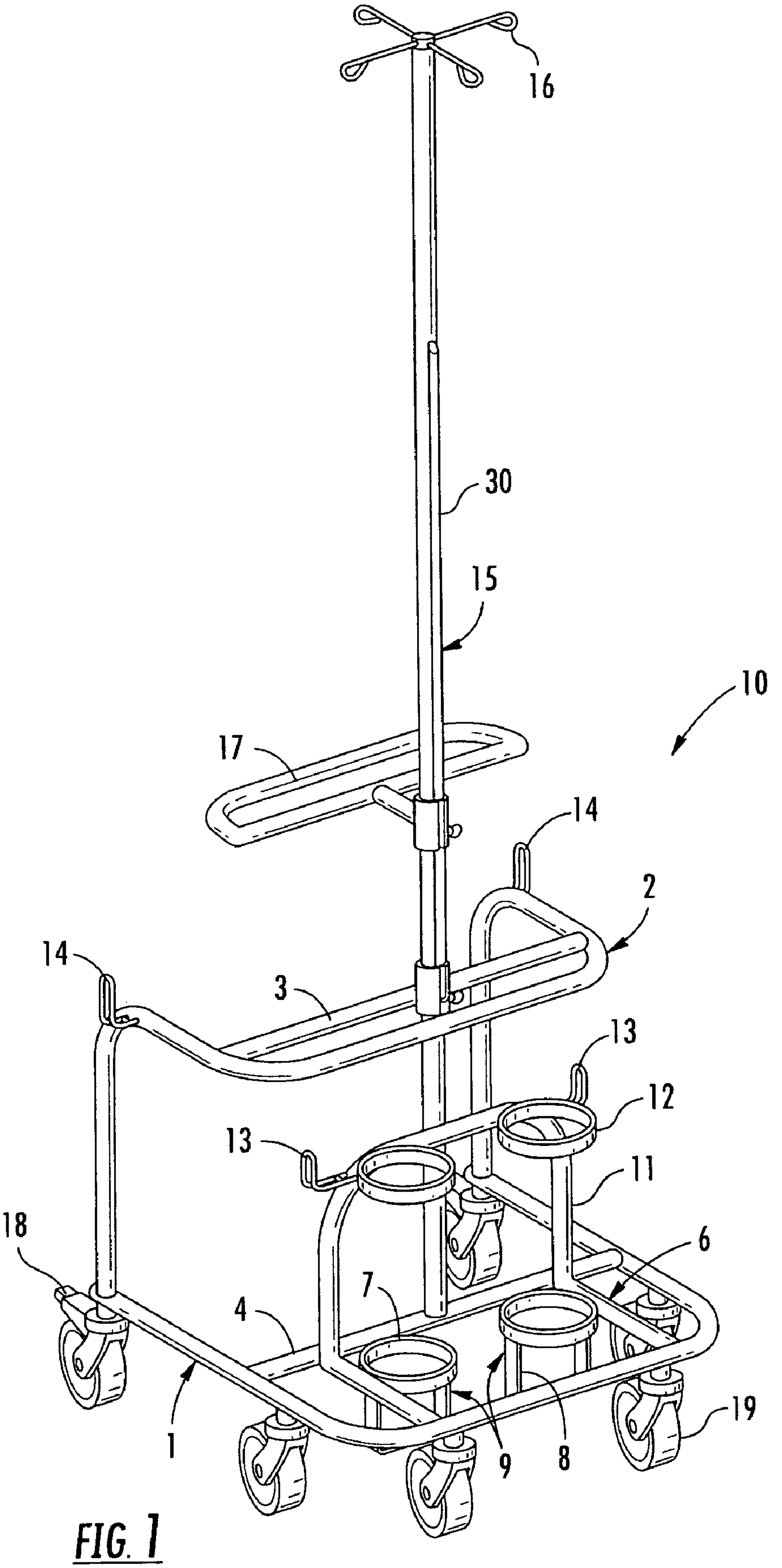
FIG. 1 is a perspective view of the patient ambulatory device of the present invention.
Figure 2:
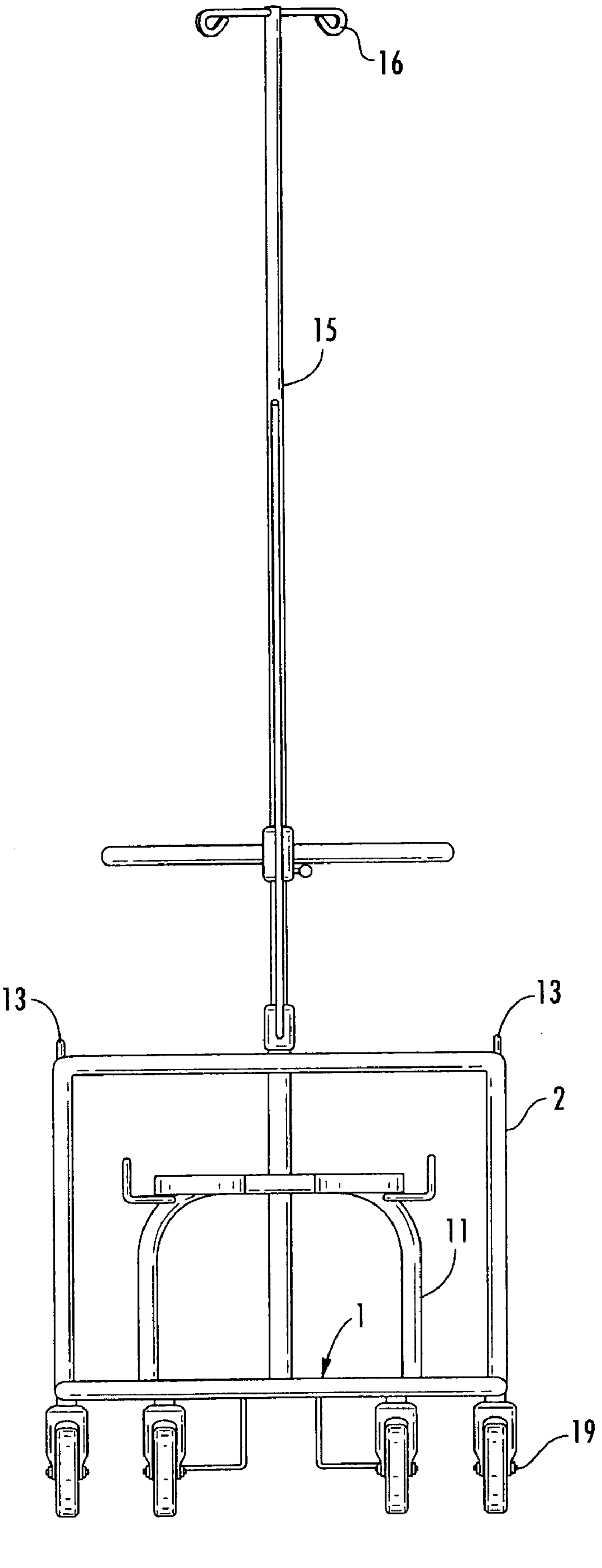
FIG. 2 is a front view of the patient ambulatory device of the present invention.
Figure 3:
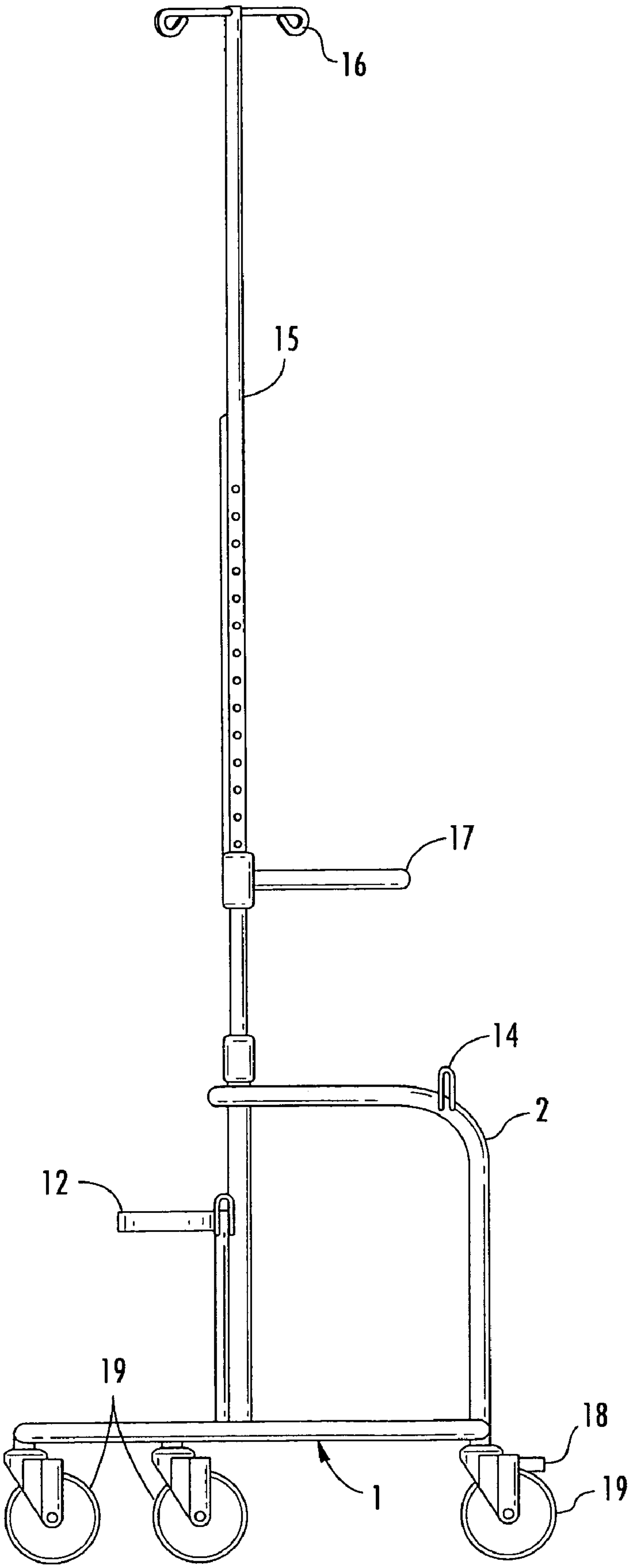
FIG. 3 is a side view of the patient ambulatory device of the present invention.
Figure 4:
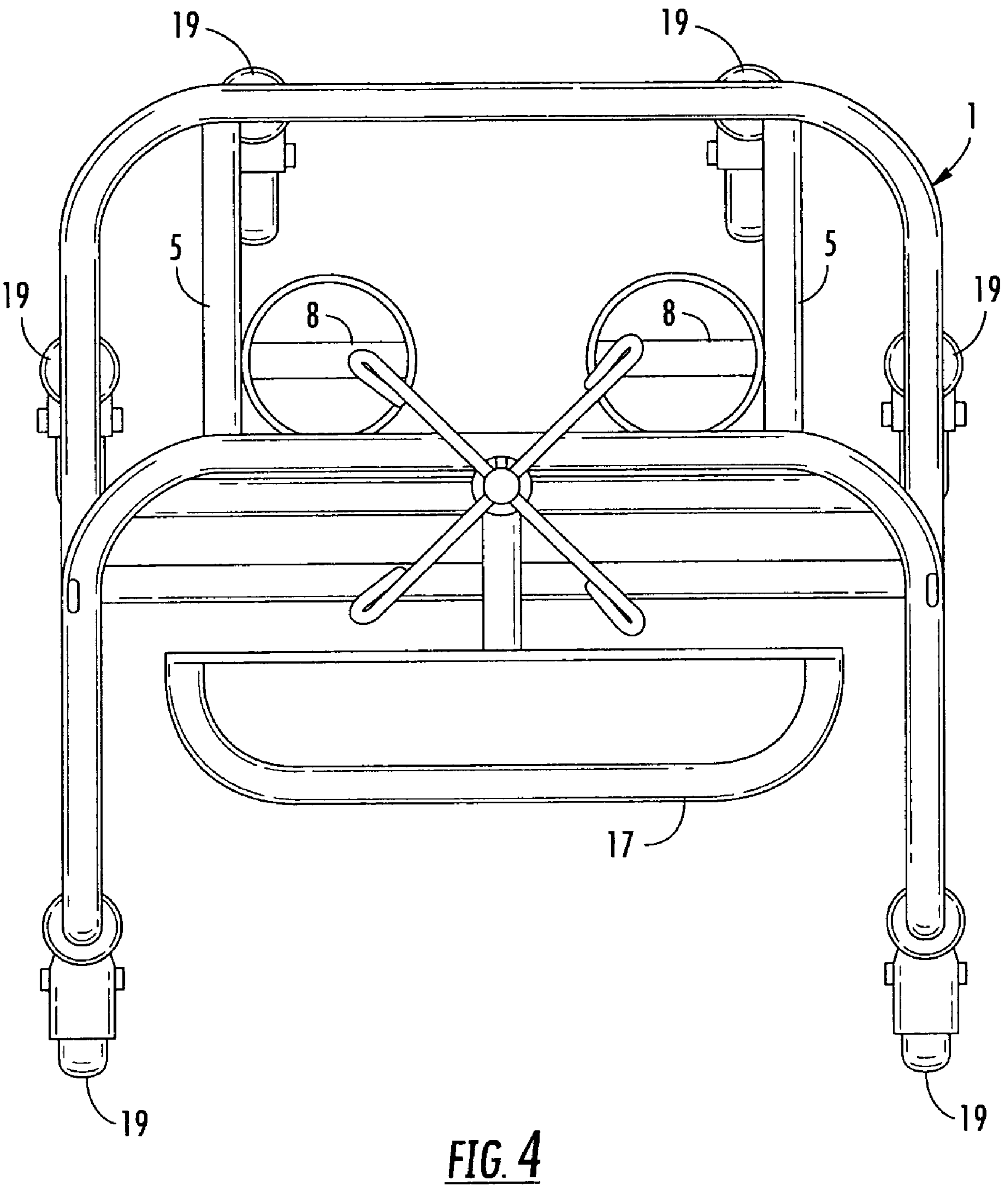
FIG. 4 is a top view of the patient ambulatory device of the present invention.

The present invention is a Bedside-ready Patient Ambulatory Device for use by ambulatory or recovering patients which is of simple, yet sturdy design and is highly mobile and easy to clean. There are three major components to the ambulatory device. The first is a lower U-shaped base frame member 1. The base frame member like the entire Bedside-ready Patient Ambulatory Device is constructed preferably of aluminum or light steel tubing. In the alternative the Bedside-ready Patient Ambulatory Device can be fabricated of stainless steel tubing, including the I.V. pole and handle. The stainless steel tubing may be acquired from MSC Industrial Supply Co of Melville, N.Y. and is designated as stainless steel 304 (tubing). Tubing generally ½ or 1 inch in diameter is preferable. Suitable aluminum tubing or conduit is commonly available from The Aluminum Company of America and is marketed as 6061-T6 aluminum tube. The second member is a mid-frame member 2. The mid-frame member 2 is generally U-shaped and upwardly extending, bent above the mid point of the distal legs of the U-shaped mid frame member to form an upper portion generally planar with the underlying U-shaped base frame member. A cross bar stabilizer 3 is connected between the distal legs of the U-shaped mid frame member at a point within the portion of the U-shaped mid-frame member which is planar to the underlying U-shaped base frame member to define there-behind a walking space for the patient. The mid frame member 2 may also include convenience loops 14 if desired. The lower U-shaped base frame member 1 further includes a crossbar support member 4 interconnecting the distal legs thereof and positioned directly beneath the crossbar stabilizer to further define the walking space for the patient. It also has six castor type wheels 19, two of which are attached, each to a separate distal end of the U-shaped base frame member and two of which are attached in spaced relationship from each other adjacent to but forward of the cross bar support member 4. The remaining two castor type wheels 19 are attached to the U-shaped base frame member 1 on the interconnecting portion between the distal legs of the base frame member generally in spaced relationship to each other. Two interconnecting bars 5 are in generally parallel relationship to each other and extend from the interconnecting portion between the distal legs of the base frame member adjacent the point of attachment of the castor type wheels to the cross bar support member 4. Two lower cylinder supports 6 each comprising a circular cylinder band 7 and a stirrup strip 8 one each extending from a separate interconnecting bar. The stirrup strips 8 and circular cylinder bands 7 define a cylinder end receptacles 9. The circular cylinder bands respectfully each attach to the cross bar support member 4 and to the interconnecting bars 5 at their respective points of attachment to the cross bar support members. Cross bar support member 4 also has attached thereto an upstanding U-shaped upper cylinder support bar 11. The upper cylinder support bar has attached thereto to upper cylinder support bands 12 which are in juxtaposition with the lower circular cylinder bands to form a complete cylinder support arrangement. The upper cylinder support bar 11 also has attached thereto convenience hooks 13. The convenience hooks 13 are attached adjacent to the upper circular cylinder bands and supply support and guidance for treatment paraphernalia which may include tubes and other items which are part of the cylinder contained gas administering system.

The third major element of the Beside-ready Patient Ambulatory Device is a vertically upwardly extending I.V. pole 15. I.V. pole 15 rests upon cross bar support member 4 and extends upwardly being attached to upper cylinder support bar 11 and cross bar stabilizer 3. I.V. pole 15 supports adjustable patient handle 17. The Preferred Embodiment of patient handle 17 is shown in FIGS. 5*a*, 5*b*, 5*c* and 5*d*. Vertically, upwardly extending I.V. pole 15 terminates in I.V. support hook 16. I.V. hook 16 may have various designs, the preferred being the cross membered, X configured design shown in the drawing.

Figure 5A:
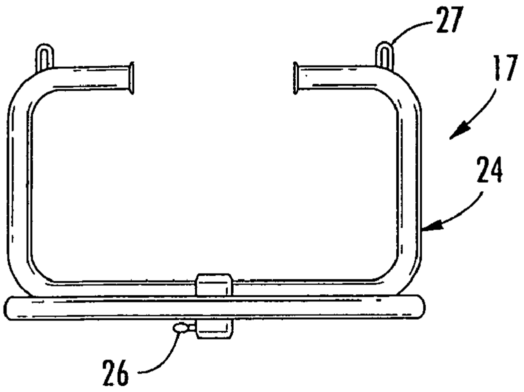
FIG. 5*a* is a front view of a preferred patient adjustable handle.
Figure 5B:
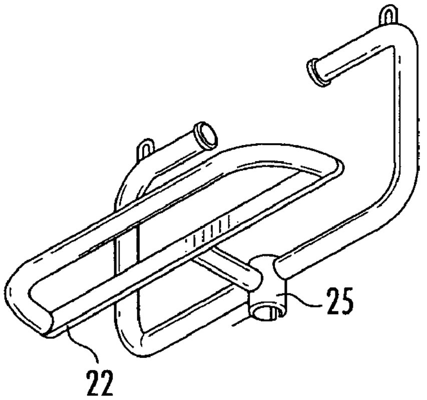
FIG. 5*b* is a right side perspective of the adjustable patient handle of FIG. 5*a*.
Figure 5C:
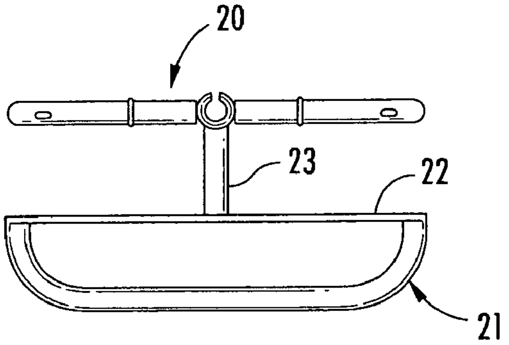
FIG. 5*c* is a top view of the adjustable patient handle of FIG. 5*a*.
Figure 5D:
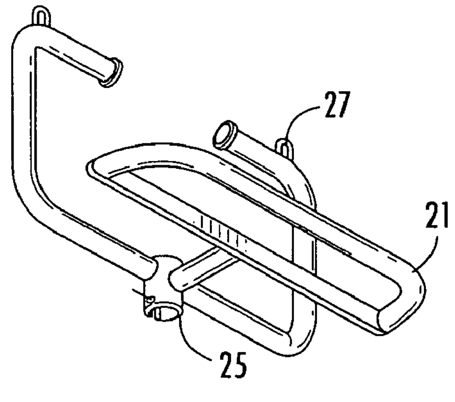
FIG. 5*d* is a left side perspective view of the patient adjustable handle of FIG. 5*a*.

Attention is now directed to FIGS. 5*a*, b, c and d which illustrate the preferred adjustable patient handle 17. The preferred handle is made up of a bow shaped gripping portion 21, a cross bar member 22 extends from the distal ends of the bow shaped gripping portion 21. Cross bow member 22 is itself attached adjacent its mid point to rectangular gripping member 24 by interconnector 23. The rectangular gripping member 24 extends generally vertically upwardly in planar relationship with I.V. support pole 15. Rectangular gripping member 24 has along its base side pole interconnection means 25. Pole interconnecting means 25 provides adjustability by way of thumbscrew 26. Pole interconnecting means 25 also is the point of attachment of interconnector 23 to rectangular gripping means 24. Optionally there may be included on the upper most portion of rectangular gripping member 24 convenience loops 27.

Figure 6:
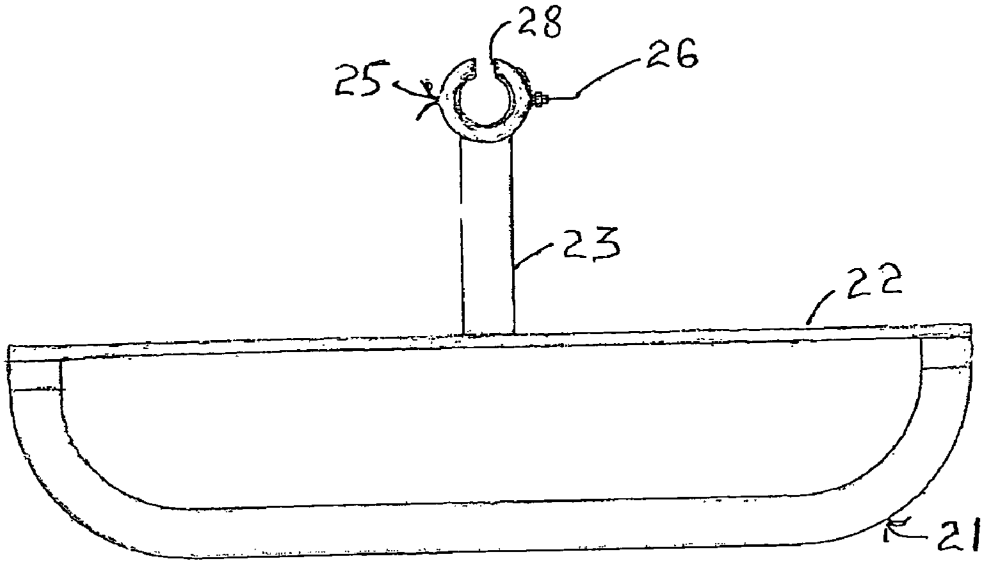
FIG. 6 shows an alternate adjustable handle.
Figure 6:
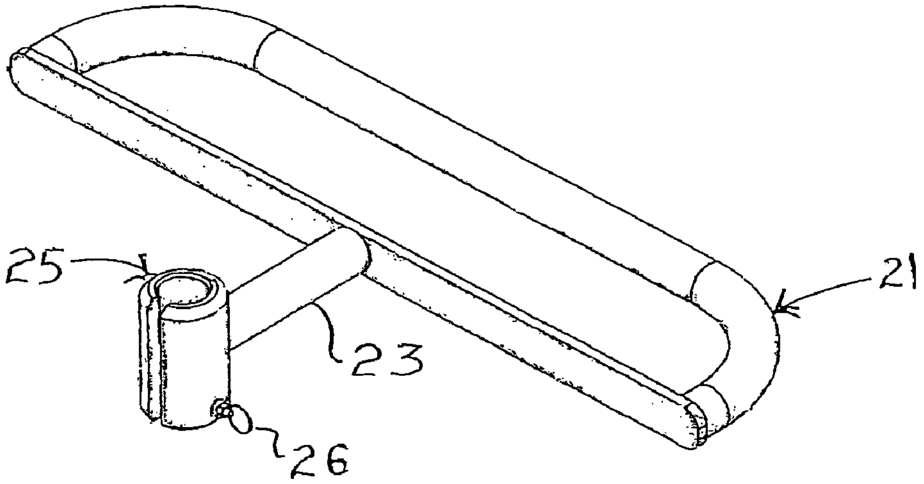

FIG. 6 shows a handle of the present invention including a bow-shaped gripping portion 21, a cross bow member 22 and interconnector 23 and a pole interconnecting means 25. The interconnecting means 25 includes thumbscrew 26 and a rotation resisting means 28. In the Embodiment FIG. 6 rotation resisting means 28 is a slot cut in general parallel relationship to the I.V. pole and adapted to receive a longitudinal rib-shaped member 30 on the I.V. pole. Rotation resisting means 28 serves to prevent movement of the bow-shaped gripping handle by preventing it from radially rotating about the I.V. pole 15. The rotation resisting means provides additional security to the position of the bow shaped gripping portion to impart the needed stability to assure the support required by a patient while either ambulatory or moving from a sitting to standing position and vice versa.

Figure 7:
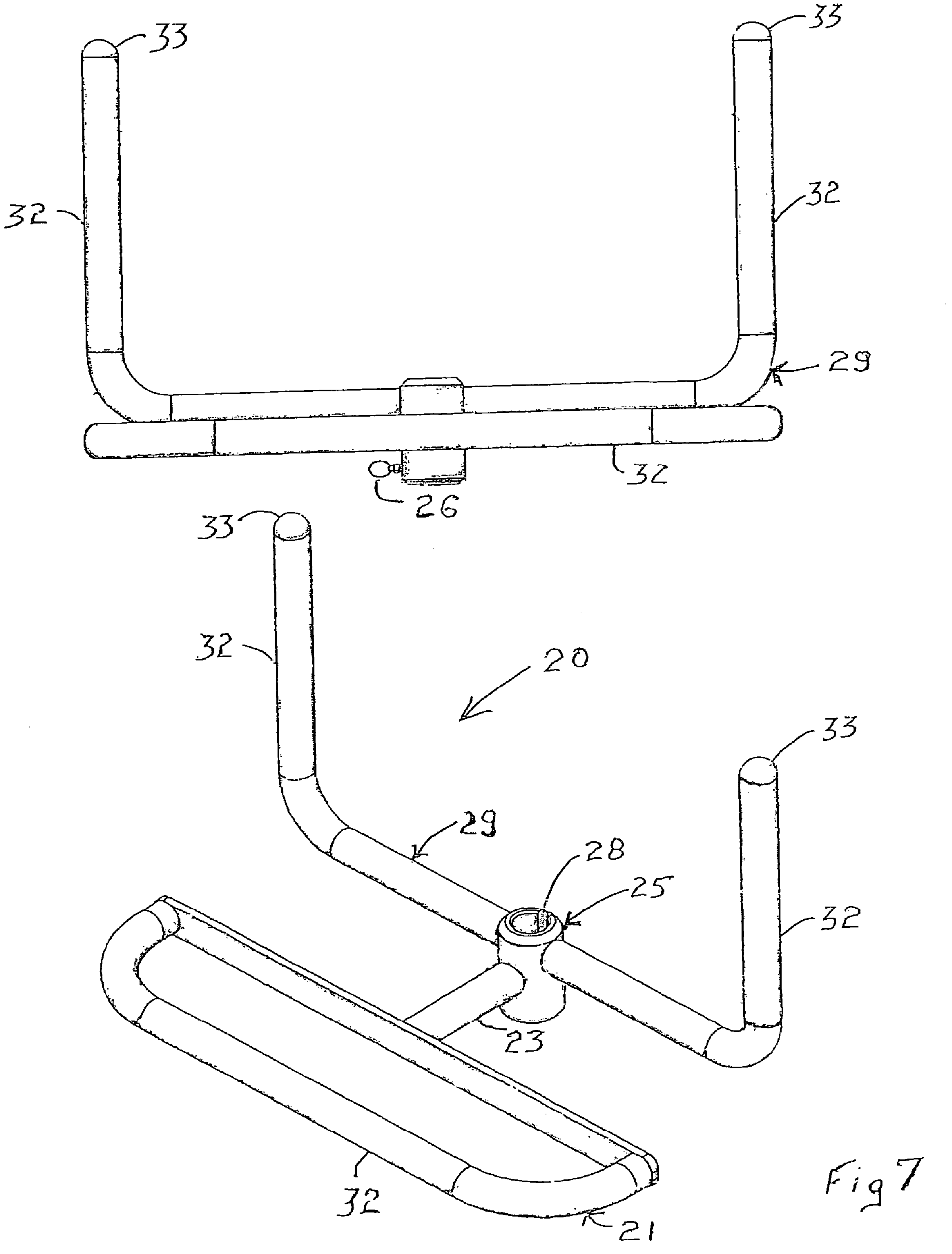
FIG. 7 shows yet another adjustable handle of the invention.

FIG. 7 shows yet another I.V. pole handle 20 having a bow-shaped gripping portion 21, cross bow member 22, interconnector 23 and rotation resisting means 28, however, in this case angular gripping member 24 has been replaced with a U-shaped gripping member 29. Also, it should be noted that rotation resisting means 28 now takes the form of an axial groove 31. This axial groove likewise can engage the axial ridge 30 on I.V. pole 15. The I.V. pole handle of FIG. 7 also includes a thumbscrew 26 to fix the vertical height of I.V. pole handle 20. The I.V. pole handle of FIG. 7 includes on its distal legs of U-shaped gripping member 29, gripping surfaces 32 which enable the patient to get a firm grip on one or both of the U-shaped distal legs for upright support. Distal legs 32 have safety caps 33 on their most distal ends for patient safety.

The foregoing description is a Bedside-ready Patient Ambulatory Device whose base support area defined by the six castor type wheels is comparable to the area occupied by the wheels on standard I.V. poles known in the art. However, the present invention provides a clear walking pathway for the patient since there are no castors in the patient's direct line of travel. Moreover the Bedside-ready device is easy to clean and disinfect. It is easy to maneuver with the locking mechanisms 18 on one or more of the castor type wheels 19. It is versatile, durable, and compact and includes two gas cylinder holders for easy transportation of required gases. The easily adjustable I.V. pole handle enables it to be positioned at the ideal level for pediatric or adult patients. There is ample suspension means provided by I.V. support hook 16. It also provides the convenience storing the patient's equipment on the Bedside-ready Patient Ambulatory Device for use in bed or during ambulation, thus avoiding time consuming disruptive transfer of patient hookups when moving from in bed to ambulation. Having thus described the invention what is claimed is:

The invention claimed is:

1. An enhanced patient mobility device for use by ambulatory patients providing a low cost, sturdy, easily mobile, stable transport facility comprising:

a tubular framework having a lower U-shaped base frame member, an upwardly extending U-shaped midframe member bent above the midpoint of distal legs of the U-shaped midframe to form an upper portion generally planar with the underlying U-shaped base frame member with a crossbar stabilizer connected between the distal legs of the U-shaped midframe member at a point within a portion of the U-shaped midframe member which is planar to the underlying U-shaped base frame member, said base frame member having a crossbar support member interconnecting the two legs of the U-shaped base frame member to provide walking space for the patient, the lower U-shaped base frame member further having a first pair of castor wheels each attached adjacent to a distal end of each of the legs of the U-shaped base frame member and a second pair of castor wheels attached in spaced relationship from each other adjacent to and forward of the crossbar support member, with a third pair of castor wheels attached to the U-shaped base frame member on an interconnecting portion between the distal legs of the base frame member, the patient mobility device further having:

two interconnecting bars extending in generally parallel relationship from the interconnecting portion between the distal legs of the base frame member adjacent to the point of attachment of the castor wheels to the crossbar support member; and, two lower cylinder supports each comprising a circular band and a stirrup member extending therefrom said band and stirrup defining a cylinder end receptacle, the circular bands respectfully each attached to the interconnecting bars at their respective points of attachment, the crossbar support member also having attached thereto an upper cylinder support bar with two upper circular cylinder support bands juxtaposed with respect to the lower circular cylinder bands to form the cylinder supports, said crossbar support member also having attached thereto near its midpoint a vertically upwardly extending intravenous (I.V.) pole which is attached to the upper cylinder support bar and the midframe member and terminates in an I.V. support hook, the I.V. pole also including a pole handle.

2. The Enhanced Patient Mobility Device of claim 1 wherein the upper cylinder support bar includes at least one convenience hook for transporting needed patient paraphernalia.

3. The Enhanced Patient Mobility Device of claim 1 wherein the I.V. support hook at the terminal end of the I.V. support pole includes a plurality of loops for supporting I.V. required items.

4. The Enhanced Patient Mobility Device of claim 1 wherein the I.V. pole handle includes at least one convenience loop for securing needed items to the handle.

5. The Enhanced Patient Mobility Device of claim 1 wherein the I.V. pole handle includes rotation resisting means.

6. The Enhanced Patient Mobility Device of claim 5 wherein the rotation resisting means comprises an axial groove for an axially extending ridge received therein.

7. The Enhanced Patient Mobility Device of claim 1 wherein the I.V. pole handle includes a rectangular gripping member.

8. The Enhanced Patient Mobility Device of claim 1 wherein the I.V. pole handle includes a U-shaped gripping member.

9. The Enhanced Patient Mobility Device of claim 8 wherein distal legs of the U-shaped gripping member include gripping surfaces.

10. The Enhanced Patient Mobility Device of claim 8 wherein the U-shaped gripping member includes safety caps on its distal ends.

* * * * *